US006366573B1

(12) United States Patent
Smith et al.

(10) Patent No.: US 6,366,573 B1
(45) Date of Patent: *Apr. 2, 2002

(54) METHOD OF, AND SYSTEM FOR, TRANSMITTING MESSAGES

(75) Inventors: David J. Smith, Worcester; Rodney W. Gibson, Ansty, both of (GB)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,991

(22) Filed: May 27, 1997

(30) Foreign Application Priority Data

May 29, 1996 (GB) .............................................. 9611146

(51) Int. Cl.[7] .................................................. H04J 3/24
(52) U.S. Cl. ........................................ 370/349; 340/7.2
(58) Field of Search ............................... 370/328, 449, 370/522, 428, 335, 342, 349; 340/311.1, 313, 825.44, 7.2; 455/31.3; 714/748, 749

(56) References Cited

U.S. PATENT DOCUMENTS

| 4,833,702 A | * | 5/1989 | Shitara et al. ................. 379/60 |
| 4,882,579 A |   | 11/1989 | Siwiak .................... 340/825.44 |
| 4,968,966 A | * | 11/1990 | Jasinski et al. ........ 340/825.44 |
| 5,124,697 A |   | 6/1992 | Moore ................... 340/825.44 |
| 5,797,085 A | * | 8/1998 | Beuk et al. ..................... 455/88 |
| 5,872,522 A | * | 2/1999 | Gibson .................. 340/825.44 |
| 5,973,613 A | * | 10/1999 | Reis et al. ............. 340/825.44 |

FOREIGN PATENT DOCUMENTS

| WO | WO9614716 |   | 5/1996 | ............ H04Q/7/10 |
| WO | 96/14716  | * | 5/1996 | ............ H04Q/7/10 |

* cited by examiner

Primary Examiner—Chau Nguyen
Assistant Examiner—D. Trinh
(74) Attorney, Agent, or Firm—Jack D. Slobod

(57) ABSTRACT

A method of transmitting messages in an answer-back paging system in which a primary station (10,14,16) transmits a series of messages addressed to respective secondary stations (20) on a down-link. The primary station then invites the secondary stations to transmit their responses, for example as CDMA signals, on an up-link. On receipt the primary station analyses those responses which are deemed to be intelligible, matches them to the originally transmitted messages and transmits acknowledgements to the relevant secondary stations. The primary station then issues another invitation to those stations whose responses had not been detected requesting them to reply on the up-link. Those responses which are deemed intelligible are processed as before and acknowledgements are transmitted together with another invitation on the down-link. The cycle of operations is repeated until either a predetermined number of cycles have elapsed or it is considered that all the intelligible responses have been received. The method can be adapted to include handling requests for service as well as handling responses to messages sent on the down-link.

12 Claims, 4 Drawing Sheets

METHOD OF, AND SYSTEM FOR, TRANSMITTING MESSAGES

BACKGROUND OF THE INVENTION

The present invention relates to a method of, and system for, transmitting messages and also to a primary station and a secondary station for use in the system. An example of such a system is an answer back paging system and for convenience reference will be made to an answer back paging system but it is to be understood that the teachings of the present invention can be applied to other 2-way messaging systems.

Answer back paging systems have been disclosed for example in PCT Patent Specification WO96/14716, which corresponds to U.S. Pat. No. 5,872,522. In an elementary form such a system requires a paging network controller (PNC) to arrange for a message to be transmitted to a predetermined addressee. The addressee on receiving a call is able to transmit a simple reply by way of a low power transmitter incorporated into the pager. The above mentioned Patent Specification discloses a system in which a series of messages are transmitted to respective addressees and the PNC then transmits invitations for the addressees to transmit their replies substantially simultaneously as spread spectrum signals which are de-spread at the PNC and the replies forwarded to the respective party requiring the reply. In order to avoid having to apply power control techniques in the pagers to ensure that replies are received by the PNC at comparable power levels, the PNC transmits its invitations at stepwise increasing (or decreasing) power levels and only those pagers just able to receive a respective one of the invitations transmit their replies. A feature of this known method is that relatively strict control of the received power is necessary.

OBJECTS AND SUMMARY OF THE INVENTION

An object of the present invention is to introduce more flexibility into the operation of answer back messaging systems.

According to one aspect of the present invention there is provided a method of operating a message transmission system comprising at least one primary station making transmissions on a down-link and a plurality of secondary stations making transmissions on an up-link, characterised by the primary station transmitting a control signal on the down-link inviting secondary stations wishing to make an up-link transmission to proceed, those of said secondary stations wishing to respond to said invitation making their transmissions, the primary station receiving at least some of the transmissions and analysing those of the received transmissions which are intelligible and determining in the case of those of the analysed, intelligible transmissions which of them comprise responses to messages sent previously on the down-link, acknowledging at least the responses and repeating the transmission of the control signal on the down-link.

The transmissions on the up-link may comprise responses to messages sent on the down-link and/or requests for a service. These transmissions may be in the form of CDMA signals transmitted substantially simultaneously.

According to a second aspect of the present invention there is provided a method of operating a message transmission system, comprising a primary station transmitting messages to a plurality of secondary stations on a down-link, the primary station inviting the secondary stations to transmit their responses on an up-link, the primary station analysing the responses received from the up-link and acknowledging receipt of those responses which were analysed successfully, the primary station determining which messages have been responded to and repeating the invitation to those secondary stations whose responses have not been acknowledged to transmit/re-transmit their responses on the up-link.

According to a third aspect of the present invention there is provided a message transmission system comprising at least one primary station and a plurality of secondary stations, the primary station having means for compiling messages to be sent on a down-link to the secondary stations, means for transmitting a signal on the down-link inviting the secondary stations to transmit responses to the messages on an up-link, means for receiving and analysing the responses, means for acknowledging receipt of responses which were analysed successfully, means for determining which of the transmitted messages have been responded to and repeating the invitation to the secondary stations whose responses have not been acknowledged to transmit/re-transmit their responses, and each of the secondary stations having means for receiving transmissions on the down-link, means for determining if any one of the messages is addressed to it, means for receiving the invitation message from the down-link, means for transmitting a response to a message addressed to the secondary station on an up-link, and means responsive to not receiving an acknowledgement of its response for repeating the transmission of the response when invited to do so.

By means of the method of, and system for, transmitting messages in accordance with the present invention it has been found that the cycle of analysing responses, acknowledging and re-inviting secondary stations not receiving acknowledgements to send or re-send their responses or other up-link transmissions increases the rate of processing of the responses compared to known systems which in turn means that the capacity of the system is increased without the need to increase the amount of infrastructure equipment.

The secondary stations may transmit their responses or other up-link transmissions substantially simultaneously as CDMA signals in which case the stronger response signals will mask the weaker signals. This is known as the near-far problem. In the method in accordance with the present invention the stronger signals on the up-link are detected first and acknowledged and then the secondary stations whose responses or other up-link transmissions have been masked are invited to send or re-send their response signals or other up-link transmissions. After several iterations of the cycle of analysing the responses or other up-link transmissions, acknowledging the successful responses or other up-link transmissions and issuing another invitation or control signal, it has been found that a very high percentage of the responses or other up-link transmissions have been processed. Those which are not processed typically are too weak to be capable of processing and/or the secondary station is either switched-off or out of range.

The time allocated to the above-mentioned cycle may be variable in that a shorter time is allocated to processing a relatively small number of strong responses or other up-link transmissions and a longer time is allocated to processing a relatively large number of weak responses or up-link transmissions and if desired the allocation of time can be made adaptive to the numbers of the response or other up-link transmission signals. This will save processing time compared to the option of allocating intervals of constant duration to processing each batch of responses or other up-link transmissions.

The acknowledgement signal and the invitation signal may be transmitted simultaneously. One method of doing this is for the primary station to transmit messages in an ordered sequence and for the next following invitation message to contain a field comprising elements allocated in an ordered sequence corresponding to the message sequence and in which the elements are adapted to distinguish those responses successfully analysed from those which are unsuccessful, for example by changing a binary '0' to a '1' when successful.

In order to increase message throughput, the population of the secondary stations may be sub-divided into at least 2 groups and while responses or other up-link transmissions from one group ire being analysed the otherwise idle transmitter can be transmitting messages to the other group, and vice versa. The division of the population may be done on the basis of odd numbered and even numbered addresses or on signal strengths (RSSIs).

According to a fourth aspect of the present invention there is provided a primary station for use in a message transmission system in which messages are transmitted on a down-link to a plurality of secondary stations which are capable of transmitting responses on an up-link, the primary station comprising means for compiling messages to be sent on the down-link to the secondary stations, means for transmitting a signal on the down-link inviting the secondary stations to transmit responses to the messages on the up-link, means for receiving and analysing the responses, means for acknowledging receipt of responses which were analysed successfully, means for determining which of the transmitted messages have been responded to and for repeating the invitation to the secondary stations whose responses have not been acknowledged to transmit/re-transmit their responses.

According to a fifth aspect of the present invention there is provided a secondary station for use in a message transmission system in which messages are transmitted on a down-link to a plurality of secondary stations which are capable of transmitting responses on an up-link, the secondary station comprising means for receiving transmissions on the down-link, means for determining if any one of the messages is addressed to it, means for receiving an invitation to reply message from the down-link, means for transmitting a response to a message on the up-link, and means responsive to not receiving an acknowledgement of its response for repeating the transmission of the response when invited to do so.

BRIEF DESCRIPTION OF THE DRAWINGS

The present invention will now be described, by way of example, with reference to the accompanying drawings, wherein.

In the drawings the same reference numerals have been used to indicate corresponding features.

DETAILED DESCRIPTION OF THE PREFERRED EMBODIMENT

Figure 1:
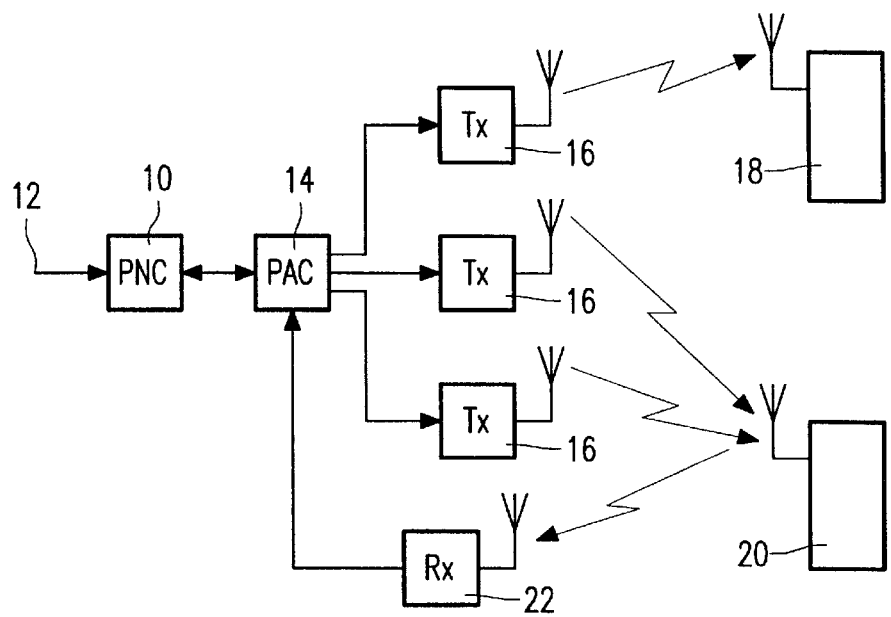
FIG. 1 is a block schematic diagram of a message transmission system.

Referring to FIG. 1, the message transmission system comprises a paging network controller (PNC) 10 having a message entry port 12 which receives pager addresses and associated messages from an operator equipped with a personal computer (PC) or directly from a subscriber having a PC and a modem. The PNC 10, which comprises directories containing information such as pager receiver identity codes (RICs), areas to be paged, frequencies, pager types, prevailing protocols, for example POCSAG (or CCIR Radiopaging Code No 1) and ERMES, and status of the pagers, assembles the messages and their associated RICs together with other relevant information into data packets which are forwarded to a paging area controller (PAC) 14 which formats the RICs and associated messages into a format which can be transmitted by base station transmitters (or transmitter section of a base station transceiver) 16 to one- and two-way pagers 18,20 respectively, by way of a down-link.

If a two-way pager 20 identifies that a message is being transmitted having its RIC, it receives the message and decodes it. If the user wishes to send a brief response then, by means of an integral key pad, he selects a pre-stored response and when invited by the PAC 16 it transmits its response by way of an up-link. The response signals may be sent simultaneously as CDMA signals or in a frame of time slots, one time slot being usable by a response.

One or more receivers (or receiver sections of a transceiver) 22 are provided for receiving the responses and for relaying them to the PAC 14 in which they are decoded in the case of CDMA signals or demultiplexed and sent as data packets to the PNC 10. The PNC 10 comprises means for analysing the signals and for matching the responses with the messages transmitted on the down-link.

Those responses which are matched are relayed to the respective users in any suitable form, for example by e-mail or by transmission as one-way paging messages. Alternatively the responses are sent to a message answering service operated by the paging network. In either case an acknowledgement is sent to the respective 2-way pager 20. However, not all the responses are matched because for example in a time division multiplex arrangement two or more responses clash and are unintelligible and in a CDMA system, strong responses smother the weak responses as a result of the near-far effect. If the PNC 10 determines that only a small proportion of the messages transmitted on the down-link have received responses then it issues a general invitation to those pagers which have not responded to the messages or have not received an acknowledgement, to transmit or re-transmit their responses on the up-link. The newly received responses are analysed, matched where possible and acknowledgements are transmitted. If it is determined that the total number of successful responses is still below a statistically determined threshold level, the cycle is repeated by transmitting another invitation signal on the down-link. The process is repeated until either a predetermined number of cycles have elapsed or the threshold level has been exceeded and it is evident that no more intelligible responses to the batch of messages are recoverable.

In the case of substantially simultaneously transmitted CDMA response signals, each time a batch of responses is received, those responses which are analysed successfully will generally have the greatest power levels at the antenna of the receiver 22. Thus as they will be eliminated from the pool of response signals, then when the next invitation signal is responded to signals from weaker sources, that is, the more distant pagers, will be decoded and matched.

Figure 2:
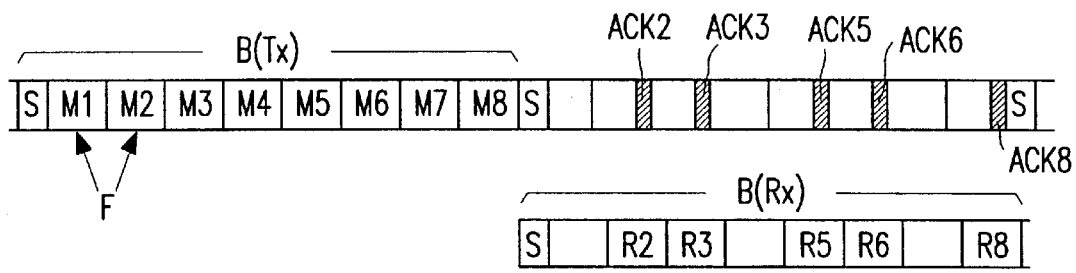
FIG. 2 is a diagram showing the transmission of messages and acknowledgements by a primary station and reception of TDMA responses.

In a TDMA type of response system one method of operating the system will be described with reference to FIG. 2 which assumes that the protocol has a batch structure in which a signal channel is divided in the time domain into a succession of batches B. Each batch commences with a synchronisation code word S and has a plurality of concatenated frames F. One of the batches B(Tx) is dedicated to transmitting paging messages M1 to M8 in accordance with a known paging protocol, such as POCSAG, on the down-link. The last code word in the batch is an invitation to the addressed pagers to transmit their responses in the corresponding frames of the next following batch B(Rx). As the responses are received they are analysed and match to the outgoing messages wherever possible. Once a match has been made, an acknowledgement ACK is transmitted to the pager on the down-link. When the analysis is complete, the PNC 10 decides if responses to all the messages have been received and if not it transmits another invitation on the down-link and the cycle of operations is repeated one or more times.

Figure 3:
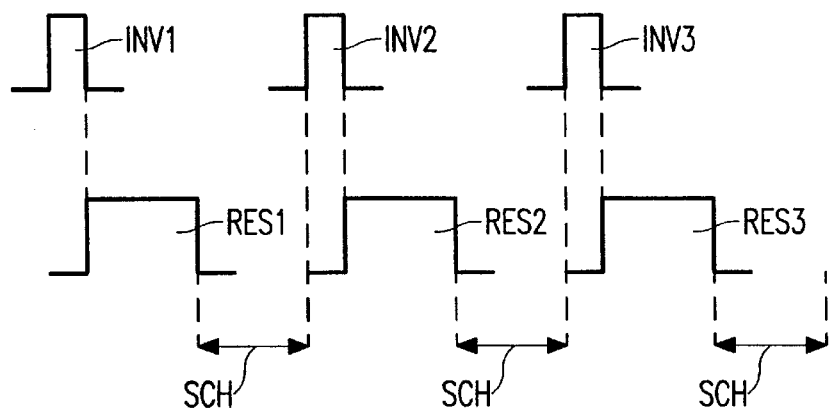
FIG. 3 is a diagram showing the transmission of invitation signals, reception of CDMA responses and the analyses of the responses

FIG. 3 illustrates an example of a system in which responses comprise CDMA signals which are transmitted simultaneously in response to an invitation signal on the down-link. In FIG. 3 messages (not shown) already have been transmitted on the down-link. A first invitation INV1 is transmitted on the down-link. The pagers which have detected a message addressed to them respond to the invitation signal INV1 by transmitting a code sequence within a defined time slot RES1. A search routine SCH is initiated following expiry of the time slot. In the search routine, codes stored in the PNC 10 (FIG. 1) are successively compared with the response code sequences and one by one the responses to particular ones of the messages are identified. However, due to the near/far problem only the strongest of the response signals are detected and these are eliminated from the next search by acknowledgement signals being transmitted on a down-link to inform those pagers which have been successful not to the respond to the subsequent invitation signals INV2 and INV3 in the sequence.

It is anticipated that in a practical system the majority of the pagers 20 (FIG. 1) will be some distance from the antenna of the receiver(s) 22 which means that they will have a low power at the antenna. Accordingly, although the durations of the time slots RES1, RES2 and RES3 may be equal, as shown, it is preferable that variable slot lengths be allocated according to the anticipated number of responses, for example a low number of relatively high powered responses and a high number of relatively low powered responses. Short slots are allocated initially so that the few, strong powers contending against low noise and interference can be eliminated efficiently. Longer slots are then allocated to accommodate the weak received powers contending against significant levels of noise and interference.

If desired the pagers 20 may have power control on their transmitters in order to vary the strength of their response signals and in so doing reduce the number of invitation/response cycles.

Figure 4:
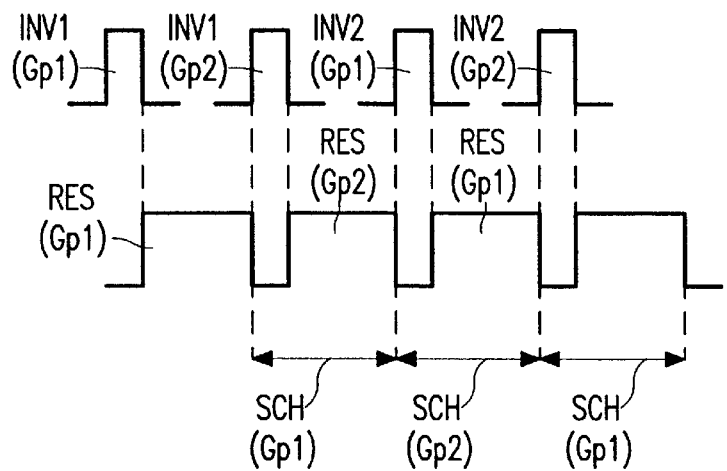
FIG. 4 is a diagram showing the interlaced operation of a CDMA response type of system.

In a refinement of the embodiment described with reference to FIG. 3, FIG. 4 shows dividing the population of the pagers into two groups and interleaving the transmission of messages and invitations for one group Gp1 on the down-link with analysing the responses on the up-link from the other group Gp2.

One method of dividing the pager population is to assign the odd numbered pagers to one group, say Gp1, and the even numbered pagers to a second group, say Gp2. An alternative method is for the pagers to measure the strength (RSSI) of the received down-link signal and by using a pre-set threshold determine to which one of say two groups they belong.

Figure 5A:
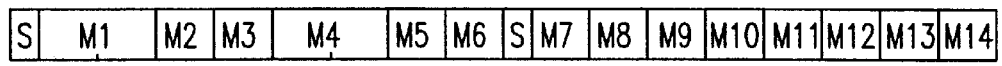
FIGS. 5A and 5B illustrate how acknowledgements are combined with an invitation signal transmitted on the down-link.
Figure 5B:
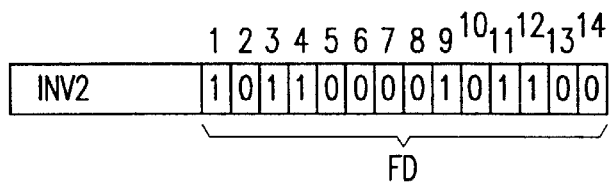

One method of issuing an invitation message whilst simultaneously informing those pagers whose responses have been analysed successfully is to send the messages M1 to M14 in an ordered sequence as shown in FIG. 5A and in the invitation signal, FIG. 5B, providing a field FD with a corresponding number of time slots on a 1 to 1 basis, thus slot 3 corresponds to message M3. When the first invitation signal INV1 is transmitted, say all the bits in the field FD are zero indicating that no responses have been received. However, after the first round of analyses, acknowledgements are transmitted to say the pagers to which the messages M1, M3, M4, M9, M11 and M13 were addressed by changing the bits in slots 1, 3, 4, 9, 11 and 13 of the field FD from "0" to "1". Further bits are changed as more of the messages are acknowledged.

The number of cycles in which invitations are transmitted may be fixed. However, if it is determined that the number of successfully decoded responses exceeds a statistically determined threshold value, then further iterations are stopped.

Figure 6:
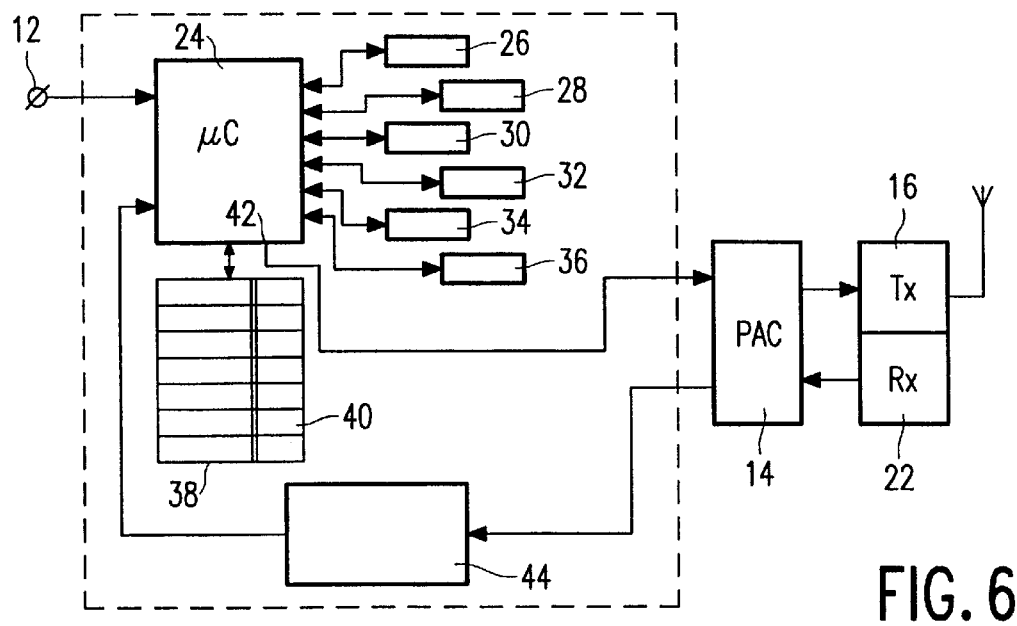
FIG. 6 is a block schematic diagram of the PNC 10.

FIG. 6 shows in block schematic form a PNC 10 coupled to a PAC 14 and a base station transmitter 16 and a receiver 22. The entry port 12 is coupled to a microcontroller 24 to which are connected directories 26 to 36 relating respectively to RICs, paging areas, frequencies, pager types, prevailing protocols and status. A message store 38 is coupled to the microcontroller 24 for storing messages as they are received at the entry port 12. The store 38 has an area 40 for storing indications confirming that a response to a respective message has been received and acknowledged. An output 42 from the microcontroller 24 is coupled to the PAC 14 to supply data packets to be formatted prior to being transmitted by the transmitter 16.

Responses received by the receiver 22 are relayed to a signal analyser 44 by way of the PAC 14. As each response is analysed successfully, it is forwarded to the microcontroller 24 for matching with the messages in the store 38. Once matched, the microcontroller arranges for an acknowledgement to be transmitted when sending the next invitation signal on the down-link. At the appropriate moment the recipients of the responses are informed, for example by e-mail or a one-way paging message, or the responses are stored together with the respective pager number so that a subscriber can interrogate the store at his or her convenience. Once the microcontroller 24 has decided that for all practical purposes all the responses have been received, it erases the messages in message store 38 in readiness for receiving more messages by way of the entry port 12. More conveniently the store 38 can comprise two halves with one half handling the acknowledgements of the messages already sent on the down-link and the other half storing messages to be sent.

Figure 7:
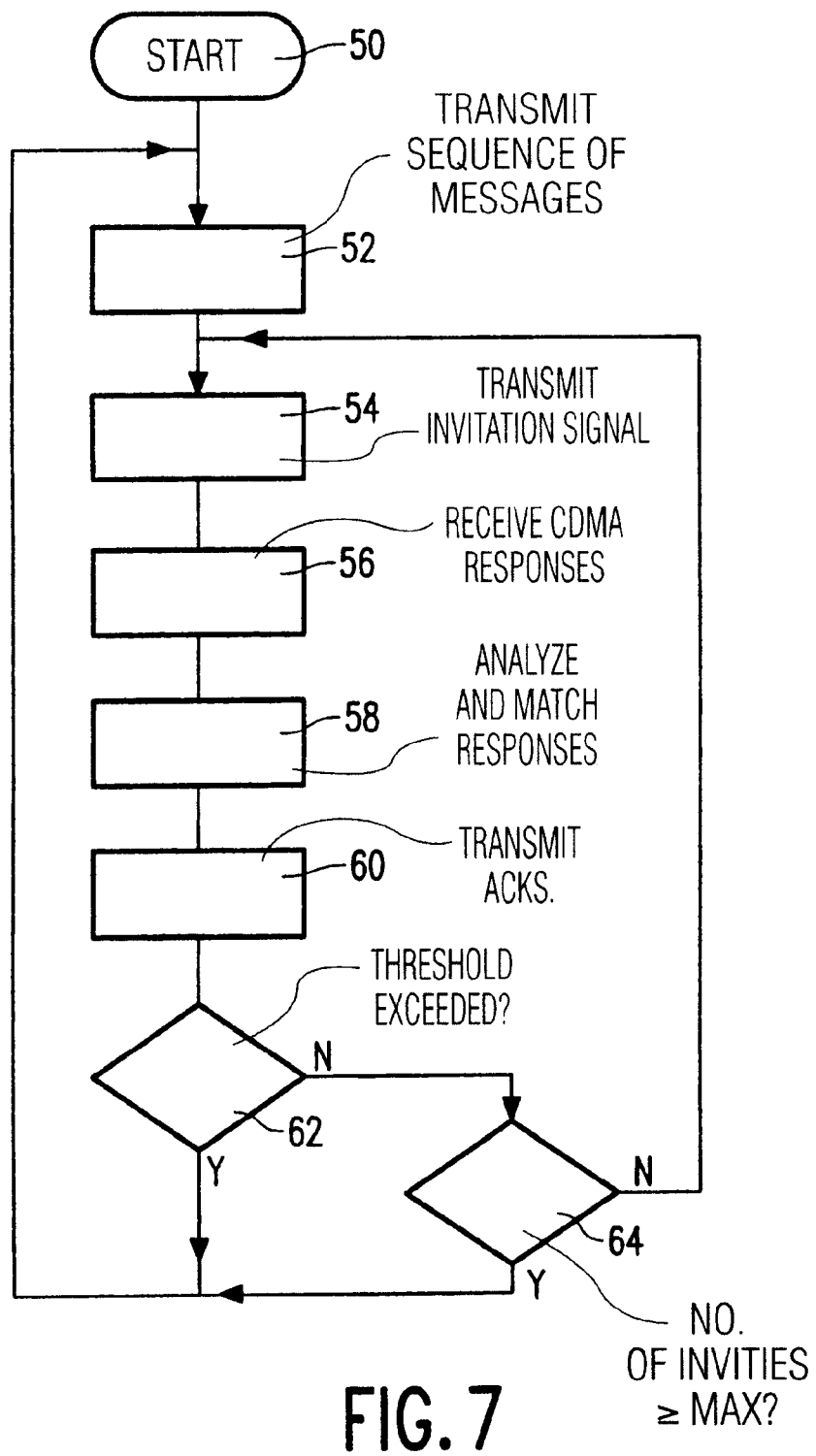
FIG. 7 is a flow chart showing the sequence of operations.

FIG. 7 is a flow chart showing the sequence of operations involved in transmitting messages, receiving responses and acknowledging responses. Block 50 represents start. Block 52 relates to the transmission of a sequence of messages and this is followed in block 54 by the transmission of an invitation signal. Block 56 relates to the reception of the CDMA responses which are then analysed and matched with their respective messages, block 58. Block 60 relates to the transmission of the acknowledgements. In block 62 a check is made to see if the number of successful responses exceeds a threshold value indicating that as many as possible responses have been received. If the answer is No(N) the flow chart proceeds to block 64 in which a check is made to see if the predetermined maximum number of invitations has been exceeded. If the answer is No(N) the flow chart reverts to the block 54. A Yes(Y) answer from the blocks 62 and 64 causes the flow chart to revert to the block 52 and the cycle is repeated.

Figure 8:
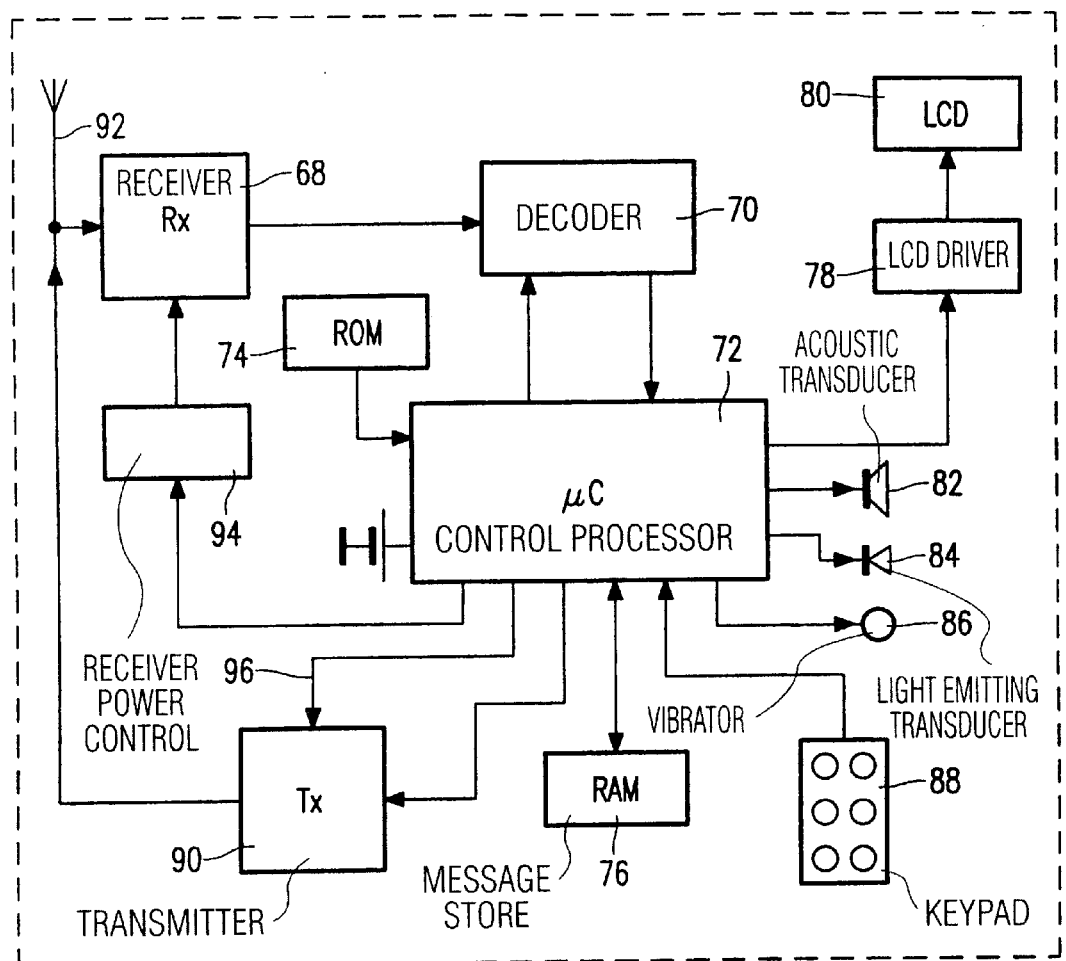
FIG. 8 is a block schematic diagram of a pager.

Referring to FIG. 8, the pager 20 comprises a receiver 68 connected to a decoder 70 which in turn is coupled to a control processor 72. The processor 72 operates in accordance with a program stored in a read-only memory 74. The processor also includes an address store (not shown) which contains the unique addresses of that pager. In the event of the pager receiving a message then this is stored in a random access memory 76. The messages can be displayed subsequently on a LCD panel 80 which has its associated driver 78 coupled to the control processor 72. Annunciating devices which may comprise an acoustic transducer 82, a light emitting transducer 84 and a vibrator 86 are coupled to the control processor 72. A keypad 88 provides a man machine interface whereby a user can instruct the processor to carry out various functions, for example to display a stored message on the panel 80. A transmitter 90 is coupled to an output of the processor 72 and to an antenna 92. A receiver power control stage 94 is coupled between the processor 72 and the receiver 68 in order to practice battery conservation in accordance with the provisions of the paging protocol being followed. In the event of the pager sending response signals as spread spectrum signals then the control processor 72 stores a number of pseudo random codes, each one being representative of a particular reply which is selected by the user actuating the keypad 88. The selected code is then relayed to the transmitter 90 for onward transmission. If as an option power control is to be applied to the transmitter 90 then a power control signal is supplied by the processor 72 through a control line 96.

Although the present invention has been described with reference to a digital paging system the present invention may be used in a cellular or cordless telephone system having provision for two-way paging.

Further the signals transmitted on the up-link may also comprise requests for services, such as registration, and accordingly the present invention is equally applicable to processing such requests for services in the same way as a response with the exception there will be no match with an outgoing message.

From reading the present disclosure, other modifications will be apparent to persons skilled in the art. Such modifications may involve other features which are already known in the design, manufacture and use of message transmission systems or component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of operating a message transmission system, comprising a primary station transmitting a sequence of messages to a plurality of secondary stations on a down-link and an invitation signal inviting the secondary stations to transmit their responses on an up-link, those of said plurality of secondary stations receiving the invitation signal, transmitting their responses, the primary station analyzing the responses received from the up-link and acknowledging receipt of those responses which were analyzed successfully, the primary station determining which of said messages have been responded to and transmitting a further invitation signal, and those of said secondary stations which receive said further invitation signal and whose responses have not been acknowledged transmitting/retransmitting their responses on the up-link, and wherein the population of secondary stations is divided into at least two groups and the transmission of me sages to one of the groups is interleaved with analysis of responses and the transmission of acknowledgements by another of the at least two groups.

2. A method as claimed in claim 1, wherein the invitation signal, analysis and acknowledgement form a cycle which is repeated a predetermined number of times.

3. A method as claimed in claim 1, wherein the invitation signal, analysis and acknowledgement form a cycle which is repeated until it is deemed that all the responses which could be analyzed have been analyzed.

4. A method as claimed in claim 1, wherein the time allocated to analyzing stronger responses is less than that allocated to analyzing weaker responses.

5. A method as claimed in claim 1, wherein the time allocated to analyzing the responses is adaptive depending on the number of secondary stations responding each time to an invitation.

6. A method as claimed in claim 1, wherein the responses on the up-link comprise CDMA sign Is which are transmitted substantially simultaneously.

7. A method of operating a message transmission system, comprising a primary station transmitting a sequence of messages to a plurality of secondary stations on a down-link and an invitation signal inviting the secondary stations to transmit their responses on an up-link, those of said plurality of secondary stations receiving the invitation signal, transmitting their responses, the primary station analyzing the responses received from the up-link and acknowledging receipt of those responses which were analyzed successfully, the primary station determining which of said messages have been responded to and transmitting a further invitation signal, and those of said secondary stations which receive said further invitation signal and whose responses have not been acknowledged transmitting/retransmitting their responses on the up-link, wherein the primary station simultaneously transmits the further invitation signal and acknowledges those responses successfully analyzed.

8. A method as claimed in claim 7, wherein the primary station transmits messages in an ordered sequence and the further invitation signal contains a field comprising elements allocated in an ordered sequence corresponding to the message sequence in which the elements are adapted to distinguish those responses successfully analyzed from those which are not successfully analyzed.

9. A message transmission system comprising at least one primary station and a plurality of secondary stations, the primary station having means for compiling a sequence of messages to be sent on a down-link to at least some of the plurality of the secondary stations, means for transmitting the sequence of messages, means for transmitting an invitation signal on the down-link inviting the secondary stations to transmit responses to the messages on an up-link, means for receiving and analyzing the responses, means for acknowledging receipt of responses which were analyzed successfully, means for determining which of the transmitted messages have been responded to and repeating the invitation message to the secondary stations whose responses have not been acknowledged to transmit/re-transmit their responses, and each of the secondary stations having means for receiving transmissions on the down-link, means for determining if any one of the messages is addressed to it, means for receiving the invitation signal from the do n-link, means for transmitting a response to a message addressed to the secondary station on an up-link, and means responsive to not receiving an acknowledgement of its response for repeating the transmission of the response following the receipt of a subsequent invitation signal, wherein the population of secondary stations is divided into at least 2 groups and the primary station comprises means for interleaving the analyzing of responses received from one of said groups on the up-link with the transmission of messages to another of said groups or the down-link.

10. A system as claimed in claim 9, wherein each secondary station has means for transmitting responses as CDMA signals and the primary station has means for decoding the CDMA responses.

11. A system as claimed in claim 10, wherein the primary station has means for adapting the length of time allocated for analyzing the responses in dependence on the number of secondary stations responding each time to an invitation signal.

12. A primary station for use in a message transmission system in which messages are transmitted on a down-link to a plurality of secondary stations which are capable of transmitting responses on an up-link, the primary station comprising means for compiling messages to be sent on the down-link to the secondary stations, means for transmitting the compiled messages on the down-link, means for transmitting an in invitation signal on the down-link inviting the secondary stations to transmit responses to the messages on the up-link, means for receiving and analyzing the responses, means for acknowledging receipt of responses which we e analyzed successfully, means for determining which of the transmitted messages have been responded to and for repeating the invitation signal to the secondary stations whose responses have not been acknowledged to transmit/re-transmit their responses, wherein the population of secondary stations is divided into at least 2 groups and the primary station comprises means for interleaving the analyzing of responses received from one of said groups on the up-link with the transmission of messages to the or another of said groups on the down-link.

* * * * *